(12) United States Patent
Romme et al.

(10) Patent No.: US 12,241,957 B2
(45) Date of Patent: Mar. 4, 2025

(54) METHOD FOR DISTANCE DETERMINATION

(71) Applicant: Stichting IMEC Nederland, Eindhoven (NL)

(72) Inventors: Jacobus Petrus Adrianus Romme, Schiedam (NL); Pepijn Boer, Vught (NL); Lichen Yao, Enschede (NL)

(73) Assignee: Stichting IMEC Nederland, Eindhoven (NL)

( * ) Notice: Subject to any disclaimer, the term of this patent is extended or adjusted under 35 U.S.C. 154(b) by 379 days.

(21) Appl. No.: 17/757,340

(22) PCT Filed: Dec. 17, 2020

(86) PCT No.: PCT/EP2020/086842
§ 371 (c)(1),
(2) Date: Jun. 14, 2022

(87) PCT Pub. No.: WO2021/123032
PCT Pub. Date: Jun. 24, 2021

(65) Prior Publication Data
US 2023/0022613 A1 Jan. 26, 2023

(30) Foreign Application Priority Data
Dec. 20, 2019 (EP) .................................... 19218751

(51) Int. Cl.
*G01S 11/02* (2010.01)
*H04B 17/10* (2015.01)
*H04B 17/27* (2015.01)

(52) U.S. Cl.
CPC ............ *G01S 11/02* (2013.01); *H04B 17/101* (2015.01); *H04B 17/27* (2015.01)

(58) Field of Classification Search
CPC ....... G01S 11/02; G01S 13/84; H04B 17/101; H04B 17/27
See application file for complete search history.

(56) References Cited

U.S. PATENT DOCUMENTS

| 4,757,315 A | * | 7/1988 | Lichtenberg | ............ | G01S 13/84 342/51 |
| 10,466,350 B2 | * | 11/2019 | Kluge | ................. | H04W 64/006 |

(Continued)

FOREIGN PATENT DOCUMENTS

| EP | 3502736 A1 | 6/2019 |
| EP | 3564707 A1 | 11/2019 |

OTHER PUBLICATIONS

Schmidt, Ralph. "Multiple emitter location and signal parameter estimation." IEEE transactions on antennas and propagation 34, No. 3 (1986): 276-280.

(Continued)

*Primary Examiner* — Kabir A Timory
(74) *Attorney, Agent, or Firm* — McDonnell Boehnen Hulbert & Berghoff LLP (57) ABSTRACT

Example embodiments relate to methods for distance determination. One embodiment includes a method for determining a distance between a first radio signal transceiver and a second radio signal transceiver. The method includes receiving a first set and a second set of measurement results. The first set is acquired by the first radio signal transceiver based on signals transmitted from the second radio signal transceiver and the second set is acquired by the second radio signal transceiver based on signals transmitted from the first radio signal transceiver. The first set is representable as including, for each of a plurality of frequencies, a measurement pair. The method also includes calculating, for each frequency of the plurality of frequencies, a preliminary estimate of a value proportional to a one-way frequency (Continued)

domain channel response. Additionally, the method includes determining a final estimate of the value proportional to the one-way frequency domain channel response.

20 Claims, 8 Drawing Sheets

(56) References Cited

U.S. PATENT DOCUMENTS

| | | |
|---|---|---|
| 2002/0094786 A1 | 7/2002 | Berliner et al. |
| 2010/0321245 A1* | 12/2010 | Aoki .................. G01S 13/87 455/73 |
| 2016/0178744 A1 | 6/2016 | Kluge et al. |
| 2019/0187263 A1 | 6/2019 | Romme |

OTHER PUBLICATIONS

Sarkar, Tapan K., and Odilon Pereira. "Using the matrix pencil method to estimate the parameters of a sum of complex exponentials." IEEE Antennas and Propagation Magazine 37, No. 1 (1995): 48-55.
Roy, Richard, and Thomas Kailath. "ESPRIT-estimation of signal parameters via rotational invariance techniques." IEEE Transactions on acoustics, speech, and signal processing 37, No. 7 (1989): 984-995.
Goldsmith, Andrea. Wireless communications. Cambridge university press, 2005.
Zepernick, H-J., and Tadeusz A. Wysocki. "Multipath channel parameters for the indoor radio at 2.4 Ghz ISM band." In 1999 IEEE 49th Vehicular Technology Conference (Cat. No. 99CH36363), vol. 1, pp. 190-193. IEEE, 1999.
PCT International Search Report and Written Opinion, Application No. PCT/EP2020/086842, mailed Mar. 16, 2021, 16 pages.

* cited by examiner

METHOD FOR DISTANCE DETERMINATION

CROSS-REFERENCE TO RELATED APPLICATIONS

The present application is a national stage entry of PCT/EP2020/086842 filed Dec. 17, 2020, which claims priority to EP 19218751.6 filed on Dec. 20, 2019, the contents of each of which are hereby incorporated by reference.

Technical Field

The present disclosure relates to a method for determining a distance between a first and a second radio signal transceiver. It also relates to a computer program product comprising a computer-readable medium storing computer-readable instructions such that when executed on a processing unit the computer program product will cause the processing unit to perform the method, and to a radio signal transceiver configured to determine a distance to a second radio signal transceiver.

BACKGROUND

Narrowband ranging methods for determining the distance between two radio transceivers have been described previously. Multi-carrier phase difference (MCPD) methods, involving phase measurements at a plurality of frequencies, are described in, e.g., documents US2016/0178744A1 and EP3502736A1.

The MCPD method disclosed in document EP3502736A1 comprises a preliminary estimation of a one-way frequency domain channel response based on two-way phase measurements at a plurality of frequencies, a time synchronization offset estimation for pairs of adjacent frequencies, a final channel estimation based on the preliminary estimation and the time offset estimation, and, finally a distance estimation based on the final channel estimation.

The two-way measurements allow phase offsets between the two transceivers to cancel out. In some embodiments, the distance determination may be performed based on the one-way frequency domain channel response, as this is less sensitive to multi-path-propagation effects. However, reconstructing the one-way frequency domain channel response from the two-way response has an inherent 180-degree phase ambiguity.

The method disclosed in EP3502736A1 solves this by using the estimation of the time synchronization offset, which provides extra information that can be used to correct the preliminary estimate of the one-way frequency domain channel response.

However, that method is dependent on phase coherence between signals transmitted at different frequencies during the two-way phase measurements.

SUMMARY

Therefore, the present disclosure provides a method of determining a distance between a first and a second radio signal transceiver applicable for narrow-band transceivers with non-coherent frequency switching at one or both transceivers.

To this end, there is provided a method for determining a distance between a first and a second radio signal transceiver, the method comprising receiving a first set of measurement results and a second set of measurement results, wherein the first set of measurement results is acquired by the first radio signal transceiver based on signals transmitted from the second radio signal transceiver and the second set of measurement results is acquired by the second radio signal transceiver based on signals transmitted from the first radio signal transceiver, the first set of measurement results being representable as comprising, for each of a plurality of frequencies, a measurement pair of a phase value and a signal strength value and the second set of measurement results being representable as comprising, for each of the plurality of frequencies, a phase value or optionally a measurement pair of a phase value and a signal strength value; calculating, for each frequency of the plurality of frequencies, a preliminary estimate of a value proportional to a one-way frequency domain channel response, based on the measurement results for the frequency from the first set of measurement results and the phase value, or optionally the measurement results for the frequency, from the second set of measurement results; calculating, for a frequency of the plurality of frequencies, a predicted estimate of a representation of the value proportional to the one-way frequency domain channel response, based on one or more estimates for one or more respective frequencies adjacent to the frequency, calculating, a first metric distance between the predicted estimate for the frequency and a representation of the preliminary estimate for the frequency; calculating a second metric distance between the predicted estimate for the frequency and a phase reversal of the representation of the preliminary estimate for the frequency; determining, for the frequency, a final estimate of the value proportional to the one-way frequency domain channel response, based on a comparison of the first metric distance and the second metric distance, the final estimate being either a phase reversal of the preliminary estimate, or the preliminary estimate; and determining the distance between the first and the second radio signal transceiver based on a plurality of such final estimates.

The term signal strength measurement should be understood to cover any measurement proportional to either the power or the amplitude of the received signal.

Receiving measurement results should be understood as either a device receiving results transmitted from a different device or making use of measurement results already locally stored on the device.

The first set of measurement results and/or the second set of measurement results being representable as comprising, for each of a plurality of frequencies, a measurement pair of a phase value and a signal strength value should be understood as including the case of the measurement results being represented as Cartesian in-phase (I) and quadrature (Q) components.

As representation of a quantity should be understood to include either the quantity itself or any suitable transformation of the same.

With phase reversal should be understood shifting the phase of the respective quantity by 180 degrees.

Calculating a predicted estimate of a representation of the value proportional to the one-way frequency domain channel response, based on one or more estimates for adjacent frequencies, and calculating the final estimate based on a comparison of the preliminary estimate and the predicted estimate uses a property of the frequency-domain response of wireless channels, namely that the one-way frequency domain channel response is correlated between adjacent frequencies at typical frequency spacings used for MCPD ranging. This provides additional information that can be used to resolve the phase ambiguity of the one-way frequency domain channel response.

Contrary to the method disclosed in EP3502736A1, there is no requirement for timing and/or phase coherence between frequencies when performing the measurements.

Thus, the present method allows reliable channel reconstruction, i.e. one-way frequency domain response without requiring time and/or phase coherency between frequencies.

Hereby, the method eases the requirement on the transceivers for narrowband ranging by removing the requirement of phase coherency across frequency switching and makes the method applicable to many narrowband transceivers, such as Bluetooth transceivers, that cannot maintain a phase lock when switching frequencies, or where maintaining such a phase lock would be hard and where each local oscillator (LO) signal used for different frequency channels has a random phase, the method of EP3502736A1 thus not being applicable, since it requires that the phase of the LO remains locked during the switching of frequency channel.

The method may be performed in one of the transceivers, which may be receiving measurement results from the other transceiver in order to be able to use both the first set and the second set of measurement results in calculating the distance. However, it should also be realized that the method may be performed in any device, such as an external device, possibly having more processing power than the first and the second transceivers. The external device may then receive the first and second sets of measurement results from the respective transceivers and may determine the distance between them. The external device may further communicate the determined distance to the transceivers, such that the transceivers may know the distance between them.

According to one embodiment, the predicted estimate is a representation of the estimate for an immediately adjacent frequency.

This allows for a straightforward, low-complexity algorithm.

According to one embodiment, the predicted estimate is an extrapolation from two or more of the estimates for two or more respective adjacent frequencies to the frequency.

This further improves accuracy of reconstruction, especially in the case of weak signals, for example due to deep fading.

According to one embodiment, the two or more respective adjacent frequencies to the frequency are lower than the frequency and the method further comprises calculating a second predicted estimate of the representation of the value proportional to the one-way frequency domain channel response, based on one or more estimates for the frequency and one or more respective frequencies adjacent to and higher than the frequency; calculating a third metric distance between the second predicted estimate and the representation of the preliminary estimate corresponding to the second predicted estimate; and calculating a fourth metric distance between the second predicted estimate and a phase reversal of said the representation of the preliminary estimate corresponding to the second predicted estimate, wherein the final estimate of the value proportional to the one-way frequency domain channel response is based on a comparison of the first metric distance, the second metric distance, the third metric distance, and/or the fourth metric distance.

Thus, extrapolation is performed from both lower frequency and higher frequency, providing further information for the final estimate, improving accuracy of reconstruction.

According to one embodiment, each representation of a respective quantity is the quantity itself.

Thus, no additional transformation of the quantities involved is performed, allowing for a straightforward, low-complexity algorithm.

According to one embodiment, each representation of a respective quantity is a frequency-dependent transformation compensating for an inherent phase advance between adjacent frequencies.

The inherent monotonous phase advance between adjacent frequencies in the one-way frequency domain channel response provides additional information, which may be used to aid reconstruction of the one-way frequency domain channel response. In particular, by removing such an overlaid rotation, prediction and extrapolation can be performed with increased accuracy.

According to one embodiment, the transformation is calculated as an average phase advance between the plurality of frequencies.

This allows for a straightforward way of compensating for the inherent phase advance, allowing for a straightforward, low-complexity algorithm.

According to one embodiment, calculating the preliminary estimate of a value proportional to the one-way frequency domain channel response comprises calculating an estimate of a value proportional to a two-way frequency domain channel response based on the measurements for the frequency from the first set of measurement results and the phase value, or optionally the measurements for the frequency, from the second set of measurement results; and calculating the preliminary estimate proportional to the one-way frequency domain channel response based on the estimate of the value proportional to the two-way frequency domain channel response.

According to one embodiment, each measurement pair of the measurement pairs is representable as a complex number, wherein the modulus of the complex number represents an amplitude corresponding to the signal strength value and the argument of the complex number represents the phase value; and the preliminary estimate and the final estimate each are representable by complex numbers, wherein the modulus of the complex number represents an amplitude response and the argument of the complex number represents a phase response.

In the complex number representation, phase reversal of a quantity corresponds to multiplying the quantity by $-1$, i.e., flipping its sign.

As is established convention in the field, a complex number representation provides a convenient notation for and convenient calculations related to periodically varying signal, wherein, again according to established convention, the actual physical real-valued signal is represented by the real part of the corresponding complex number. However, as will be readily understood, any other suitable representation may be used when carrying out the actual calculations. In particular, when it is stated that a calculation "may be represented" as an operation involving one or more complex numbers, it will be understood to cover any mathematically equivalent calculation no matter the actual representation used.

According to one embodiment, the second set of measurement results comprises, for each of the plurality of frequencies, the measurement pair and the calculating of the estimate of the value proportional to a two-way frequency domain channel response comprises, or is representable as comprising, multiplying the complex number representing the measurement pair from the first set of measurement results with the complex number representing the measurement pair from the second set of measurement results.

According to one embodiment, calculating of the preliminary estimate of the value proportional to the one-way frequency domain channel response based on the estimate of the value proportional to the two-way frequency domain channel response comprises, or is representable as comprising, taking a complex square root of the estimate proportional to the two-way frequency domain channel response.

Taking a complex square root has an inherent π (180-degree) phase ambiguity and one of the two possible solutions need to be selected. For example, according to one embodiment, when taking the square root, a solution with the phase between $-\pi/2$ and $\pi/2$ may be selected, i.e., the solution where the real part is positive.

For example, according to one embodiment, when taking the square root, a solution with the phase between $-\pi/2$ and $\pi/2$ is selected, i.e., the solution where the real part is positive.

According to one embodiment, determining of the distance between the first and the second radio signal transceiver uses an algorithm based on IFFT and/or a super-resolution algorithm.

According to a second aspect, there is provided a computer program product comprising a computer-readable medium storing computer-readable instructions such that when executed on a processing unit the computer program product will cause the processing unit to perform the method above.

Effects and features of this second aspect are largely analogous to those described above in connection with the first aspect. Embodiments mentioned in relation to the first aspect are largely compatible with the second aspect.

According to a third aspect, there is provided a radio signal transceiver configured to determine a distance to a second radio signal transceiver, the radio signal transceiver comprising a measurement unit configured to acquire a first set of measurement results based on signals transmitted from the second radio signal transceiver, the first set of measurement results being representable as comprising, for each of a plurality of frequencies, a measurement pair of a phase value and a signal strength value; a receiver configured to receive a second set of measurement results acquired by the second radio signal transceiver based on signals transmitted from the first radio signal transceiver, the second set of measurement results being representable as comprising, for each of a plurality of frequencies, a phase value or optionally a measurement pair of a phase value and a signal strength value; and a processing unit configured to calculate for each frequency of the plurality of frequencies, a preliminary estimate of a value proportional to a one-way frequency domain channel response, based on the measurement results for the frequency from the first set of measurement results and the phase value, or optionally the measurement results for the frequency, from the second set of measurement results; calculate, for a frequency of the plurality of frequencies, a predicted estimate of a representation of the value proportional to the one-way frequency domain channel response, based on one or more said of the preliminary estimates for one or more respective frequencies adjacent to the frequency; calculate a first metric distance between the predicted estimate for the frequency and a representation of the preliminary estimate for the frequency; calculate a second metric distance between the predicted estimate for the frequency and a phase reversal of id the representation of the preliminary estimate for the frequency; determine, for the frequency, a final estimate of the value proportional to the one-way frequency domain channel response, based on a comparison of the first metric distance and the second metric distance, the final estimate being either a phase reversal of the preliminary estimate, or the preliminary estimate; and determine the distance between the first and the second radio signal transceiver based on a plurality of such final estimates.

Effects and features of this third aspect are largely analogous to those described above in connection with the first and second aspects. Embodiments mentioned in relation to the first and second aspects are largely compatible with the third aspect.

Thus, a radio signal transceiver may be able to determine a distance to a second radio signal transceiver in a robust manner. In a pair of radio signal transceivers performing measurements, one of the radio signal transceivers may perform calculations to determine the distance between the transceivers. This transceiver may then communicate the determined distance to the other transceiver, such that both transceivers know the distance between them.

BRIEF DESCRIPTION OF THE DRAWINGS

The above, as well as additional features, will be better understood through the following illustrative and non-limiting detailed description, with reference to the appended drawings. In the drawings like reference numerals will be used for like elements unless stated otherwise.

DETAILED DESCRIPTION

The disclosed method may, using the multicarrier phase difference (MCPD) ranging principle, for a range determination, i.e., a distance determination, between a first radio signal transceiver, device A, and a second radio signal transceiver, device B, use as input a first set of measurement results and a second set of measurement results, wherein the first set of measurement results is acquired by the first radio signal transceiver, i.e., device A, based on signals transmitted from the second radio signal transceiver, i.e., device B, and the second set of measurement results is acquired by the second radio signal transceiver, i.e., device B, based on signals transmitted from the first radio signal transceiver. Each set of measurement results comprises, for each of a plurality of frequencies, a measurement pair of a phase measurement and a signal strength measurement.

Acquiring of the measurement results may start with the two devices A and B agreeing on the ranging parameters, align their frequencies (e.g. using carrier frequency offset (CFO) estimation and calibration) and realize coarse time synchronization, i.e. both A and B start a (digital) counter, i.e, clock at, e.g., the transmission/reception of a start frame delimiter (SFD) which both devices A and B use to control a local state machine. The state machine controls when which transceiver is doing what.

Figure 1:
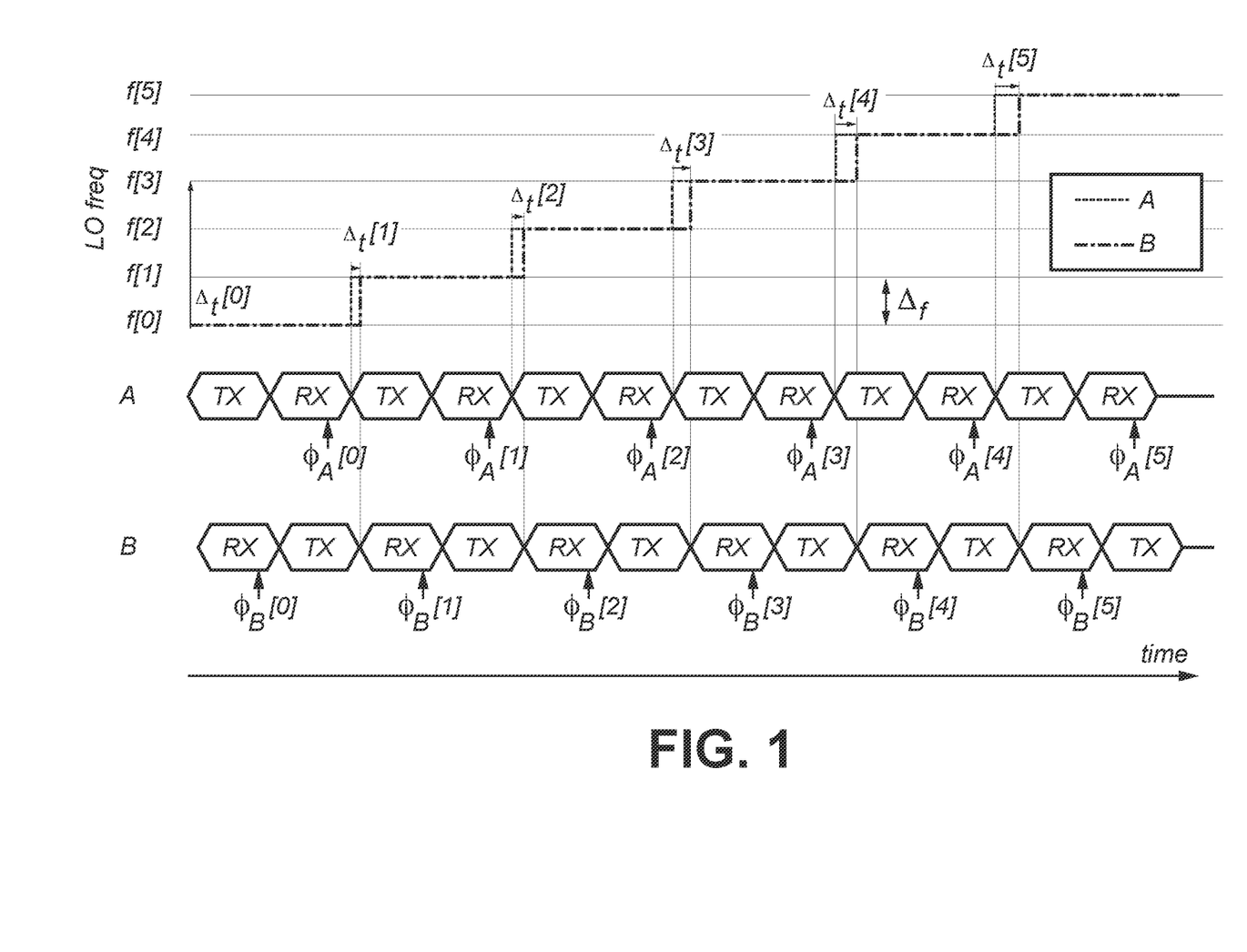
FIG. 1 is a timing diagram of transmissions between two transceivers, according to example embodiments.

As illustrated in FIG. 1, the measurements may be performed in the following steps:

0. Device A and Device B setting their respective local oscillators (LOs) to a predetermined frequency and setting the loop counter k=0.
1. Device A transmitting its LO signal and Device B performing a phase measurement ([k]) relative to its own LO. Further, device B may perform a received signal strength indication measurement $RSSI_B[k]$ (not shown). Alternatively, device B may perform a measurement of the Cartesian $I_B[k]$ (in-phase) and $Q_B[k]$ (quadrature) components of the signal received at B, relative to its own LO.
2. Device A and B changing transmit direction, allowing a guard time for stabilizing the LO.
3. Device B transmitting its LO signal and Device A performing a phase measurement ($\phi_A[k]$) relative to its own LO. Further, device A may perform a received signal strength indication measurement $RSSL_A[k]$ (not shown). Alternatively, device A may perform a measurement of the Cartesian $I_A[k]$ (in-phase) and $Q_A[k]$ (quadrature) components of the signal received at A, relative to its own LO.
4. Device A and Device B increasing the frequency of their respective LOs by a predetermined frequency spacing $\Delta_f$ and go back to step 1. This loop is repeated a predetermined number of times ($K_f$), resulting in measurements at $K_f$ different frequencies with a spacing $\Delta_f$ and ordered in frequency according to their respective frequency index k. For example, measurements may be performed with a 1 MHz frequency spacing of an 80 MHz band at 2.4 GHz.

Device A and device B have respective phase-locked loops (PLLs) to generate their respective local oscillator (LO) signals. When switching from transmit to receive or vice-versa, for each single frequency k, the PLLs remain on to allow for continuous phase signals.

Figure 2:
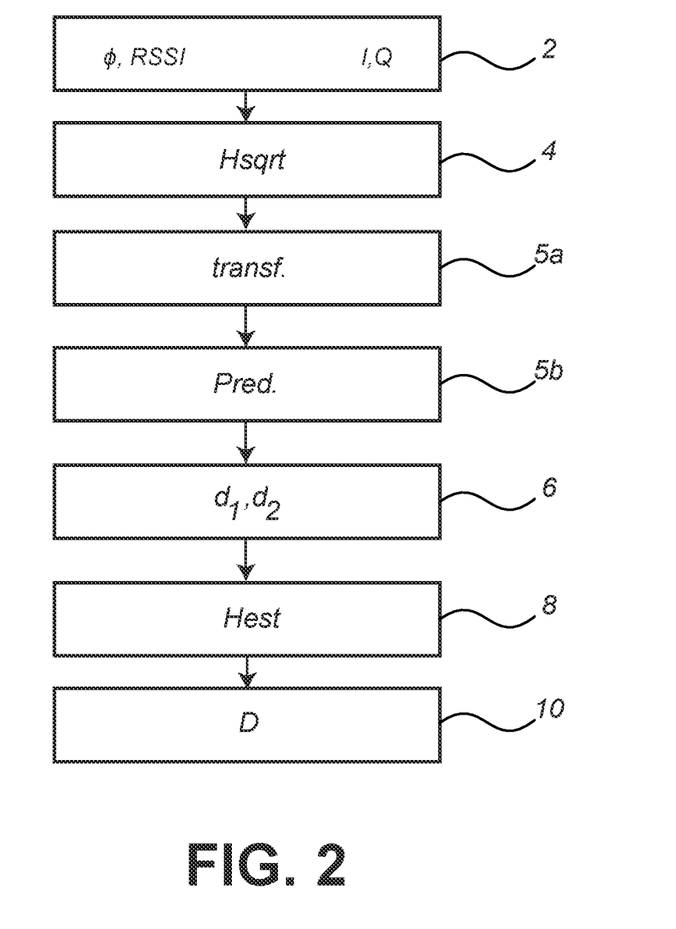
FIG. 2 is a flowchart summarizing steps of the method, according to example embodiments.

FIG. 2 summarizes steps of the method. In block 2 of FIG. 2, once the measurements have been carried out, the method for determining the distance is not very time-critical. Therefore, it may be computed on a third device/entity with more processing power, which is, e.g., in the cloud, assuming the entity has access to the measurement data from both transceivers. Thus, the method may either be performed on device A and/or B, but may also be collected on a third Device C, which can then calculate the distance between A and B, where device C may be in the cloud. If a device is not to carry out the method, it may transmit, or cause to be transmitted its measurement results to the device that is to carry out the method. Thus, for example, if the method is to be carried out on device C, device B may transmit a frame with all its phase measurements to Device C ($\phi_B[0:K_f-1]$) and device A may transmit a frame with all its phase measurements to Device C ($\phi_A[0:K_f-1]$). Similarly, the RSSI measurements $RSSL_A[0:K_f-1]$ and, optionally, $RSSI_B[0:K_f-1]$ will be transmitted to the device carrying out the method, for example device C. Thus, the device carrying out the method receives the first set of measurement results, comprising $\phi_A[0:K_f-1]$ and $RSSI_A[0:K_f-1]$ (or $I_A[0:K_f-1]$ and $Q_A[0:K_f-1]$) and the second set of measurement results, comprising $\phi_B[0:K_f-1]$ and, optionally, $RSSI_B[0:K_f-1]$ (or $I_B[0:K_f-1]$ and $Q_B[0:K_f-1]$].

Alternatively, device A will carry out the method and may then comprise a measurement unit configured to acquire the first set of measurement results based on signals transmitted from the second radio signal transceiver, i.e., device B, as per the above. It may further comprise a receiver configured to receive the second set of measurement results acquired by the second radio signal transceiver, i.e., device B, based on signals transmitted from the first radio signal transceiver, i.e., device A. Further, device A may comprise a processing unit for carrying out the steps of the method, as will be described below.

For each frequency and set of measurements, a complex number may be formed, proportional to the one-way frequency domain response, where the modulus represents an amplitude corresponding to the signal strength measurement and the argument of the complex number represents the phase measurement:

$$H_A[k]=A_A[k]\exp(j\phi_A[k])$$

$$H_B[k]=A_B[k]\exp(j\phi_B[k])$$

where $A_A[k]$ and $A_B[k]$ are values proportional to signal amplitude, obtainable, for example, by taking the square root of the corresponding RSSI values.

Alternatively, in the case of measurement of the I and Q components of the signal, $H_A[k]$ and $H_B[k]$ may be formed thus:

$$H_A[k]=I_A[k]+jQ_A[k]$$

$$H_B[k]=I_B[k]+jQ_B[k]$$

In the absence of thermal or phase-noise, these measured magnitudes and phases at the kth frequency are related to the actual channel responses H[k] as follows $$H_A[k] \propto H[k]\exp(j2\pi\theta[k])$$

where $\theta[k]$ denotes a phase offset between A and B during the measurement of the kth frequency and the symbol $\propto$ denotes proportionality, i.e., $a[k] \propto b[k]$ means that $a[k]=c\,b[k]$ for all values of k, where c is an unknown complex-value, but the same for all k.

Contrary to the method disclosed in EP3502736A1, there is no restriction on $\theta[k]$, which can be allowed to vary arbitrarily from frequency to frequency k.

Similarly, at B, we will measure $$H_B[k] \propto H[k]\exp(-j2\pi\theta[k])$$

In block 4 of FIG. 2, an estimate X[k] of a value proportional to a two-way frequency domain channel response can be formed by multiplying the two values together, thereby canceling out the factors related to the offsets $\theta[k]$, since, as the measurements at A and B are taken shortly after each other, we may assume that $\theta[k]$ did not change:

$$X[k]=H_A[k]H_B[k] \propto (H[k])^2.$$

Thus, the calculation of the estimate of a value proportional to the two-way frequency domain channel response is based on the measurement pair from the first set of measurement results and the measurement pair from the second set of measurement results. Moreover, it comprises, or may be represented as comprising, multiplying the complex number representing the measurement pair from the first set of measurement results with the complex number representing the measurement pair from the second set of measurement results.

Alternatively, X[k] may, regarding amplitude, be calculated based on the measurement at A only:

$$X[k] = \|H_A[k]\|^2 \exp(\phi_A[k] + \phi_B[k]) \propto (H[k])^2$$

where $\|\ \|^2$ denotes the absolute squared-operator. Note that $\|H_A[k]\|^2$ is equal to the $RSSL_A[k]$.

Thus, here, calculating the estimate of a value proportional to the two-way frequency domain channel response is based on the measurement pair from the first set of measurement results and the phase measurement from the second set of measurement results.

In the following, the one-way frequency-domain channel response H[k] will be reconstructed using a) X[k] and b) correlation properties for H[k] for adjacent frequencies.

A preliminary estimate $H_{sqrt}[k]$ of the one-way frequency domain channel response H[k] is calculated by taking the square root of the estimate proportional to the two-way frequency domain channel response X[k]:

$$H_{prelim}[k] = H_{sqrt}[k] = \sqrt{X[k]} \propto c[k]H[k]$$

which is related to the true one-way frequency-domain channel response according to the proportionality above, where c[k] is either +1 or −1, caused by the inherent phase ambiguity of taking a complex square root. To estimate the values of c[k], we use the correlation properties for H[k].

Thus, starting from the estimated frequency-domain channel response $H_{prelim}[k]$ that contains random phase reversals, i.e., sign flips at various frequency indices k, we want to detect those sign-flips (or, equivalently, the signs in c) and corrects them to restore the phase structure along the frequency dimension.

For the preliminary estimate, for example, solutions with the phase between $-\pi/2$ and $\pi/2$ may be selected, i.e., with a positive real part.

Thus, for each frequency, the preliminary estimate of the value proportional to the one-way frequency domain channel response is calculated based on the measurement pair from the first set of measurement results and the phase measurement, or optionally the measurement pair, from the second set of measurement results.

At block 5a, optionally, each preliminary estimate $H_{prelim}[k]$ may undergo a transformation, which may be frequency dependent, resulting in a representation $H_{prelim}'[k]$ of each preliminary estimate, as will be described further below.

Alternatively, as described below, calculations may be performed directly on values of $H_{prelim}[k]$. In that case, each representation $H_{prelim}'[k]$ of a quantity is the quantity itself, i.e., $H_{prelim}'[k] = H_{prelim}[k]$.

At block 5b, for a frequency index k in the plurality of frequencies, a predicted estimate $H_{pred}'[k]$ of H'[k] is calculated based values of $H_{prelim}'[k]$ for frequency indices adjacent to k, i.e., $H_{prelim}'[k-1]$, $H_{prelim}'[k-2]$ . . . and/or $H_{prelim}'[k+1]$, $H_{prelim}'[k+2]$ . . . .

In some cases, the predicted estimate $H_{pred}'[k]$ of H'[k] may be calculated as the value of the estimate for the preceding frequency index k−1

$$H_{pred}'[k] = H_{prelim}'[k-1].$$

Alternatively, the predicted estimate may be based on extrapolation from two or more adjacent frequency indices, as will be described below.

At block 6, a first metric distance $d_L$ between the predicted estimate $H_{pred}'[k]$ and the preliminary estimate $H_{prelim}'[k]$ is calculated:

$$d_L = \|H_{prelim}'[k] - H_{pred}'[k]\|.$$

Still at block 6, a second metric distance $d_L'$ between the predicted estimate $H_{pred}'[k]$ and a phase reversal $-H_{prelim}'[k]$ of the preliminary estimate $H_{prelim}'[k]$ may be calculated as:

$$d_L' = \|-H_{prelim}'[k] - H_{pred}'[k]\| = \|H_{prelim}'[k] + H_{pred}'[k]\|.$$

The metric according to which the first metric distance $d_L$ and the second metric distance $d_L'$ is calculated may be the complex number norm, or some other geometric metric, i.e., distance measure.

At block 8, a final estimate $H_{est}[k]$ of the one-way frequency domain channel response is determined. The final estimate $H_{est}[k]$ is based on a comparison of the predicted estimate $H_{pred}'[k]$ with the preliminary estimate $H_{pred}'[k]$ and its phase reversal $-H_{pred}'[k]$, more specifically based on a comparison of the first metric distance $d_L$ and the second metric distance $d_L'$, as calculated at block 6.

Under an assumption of Gaussian-distributed random errors, $d_L$ is a measure for the likelihood given no sign-flip, i.e., no phase reversal is required in the final estimation relative to the preliminary estimation and $d_L'$ is a measure for the likelihood that a phase reversal is required.

Thus, if $d_L' < d_L$, this indicates an incorrect sign in the preliminary estimate $H_{prelim}[k]$ and the final estimate is determined to be $$H_{est}[k] = -H_{prelim}[k].$$

Otherwise, the final estimate is determined to be $$H_{est}[k] = H_{prelim}[k].$$

Thus, the final estimate $H_{est}[k]$ is either a phase reversal $-H_{prelim}[k]$ of the preliminary estimate, or the preliminary estimate $H_{prelim}[k]$.

Further, the representation of the preliminary estimate may be updated $$H_{prelim}'[k] = H_{est}'[k],$$

and blocks 5b, 6, and 8 be repeated for a different value of k, using the updated preliminary estimate.

In particular, the estimation may be blocks 5b, 6, and 8 may be repeated in sequence for successive values of frequency indices k=1, 2, . . . $K_f$−1. In that case, in the case of a determination of $H_{est}[k] = -H_{prelim}[k]$, i.e., a phase reversal required, for a frequency index k=m, all subsequent preliminary estimates may be phase reversed as well, i.e., $$H_{prelim}'[m] = -H_{prelim}'[m] \text{ for } m \geq k,$$

i.e., a sign-flip of all measurements stating at frequency index m. If two such sign changes are observed at say m and n with m<n, the values between m≤k<n are multiplied by −1 and the remainder by $(-1)^2=1$. For three or more jumps, the procedure is simply extended. To limit the number of multiplications, first a mask can be created to keep track of which values should be sign-flipped and which not.

Figure 3A:
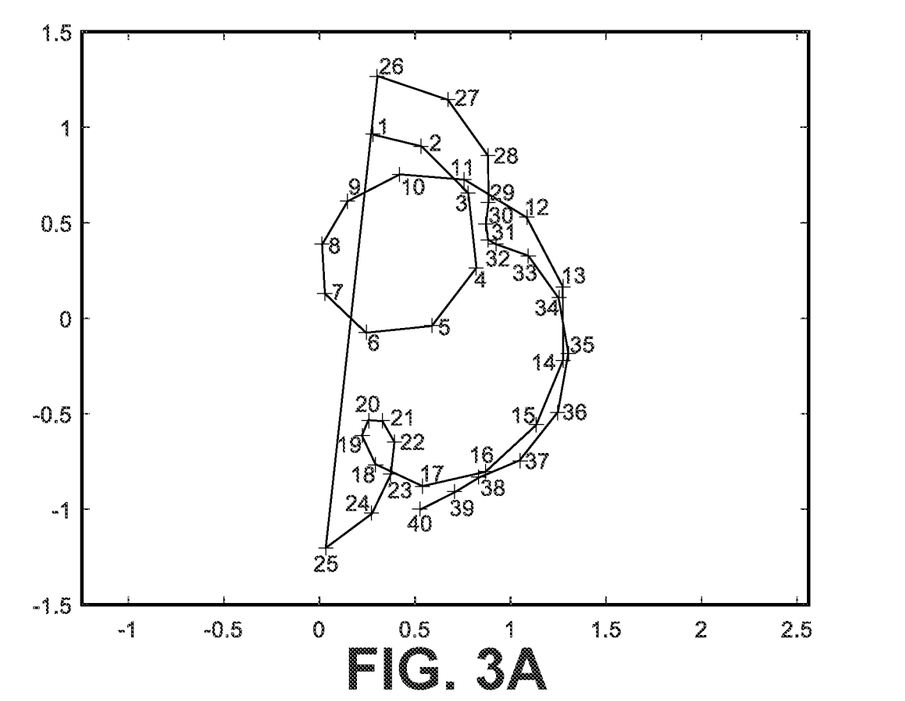
FIG. 3A shows a simulated example of a preliminary estimate of a one-way frequency-domain channel response, according to example embodiments.

FIG. 3A shows a simulated example of $H_{sqrt}[k]$ from one antenna at 80 different frequency channels that are spaced 1 MHz apart. The number markers are the frequency indices k.

It can be observed that between frequency 25 and 26 a jump is present. In fact, the frequency 26 (and all subsequent) is phase-inversed. In this case if frequency 26 were to be flipped back with respect to the origin, its distance to frequency 25 would be much smaller and thus more reasonable compared to the distance of other successive frequency pairs. Once the phase reversal is detected, the samples at frequency 26 and all subsequent frequencies may have their phase reversed.

Figure 3B:
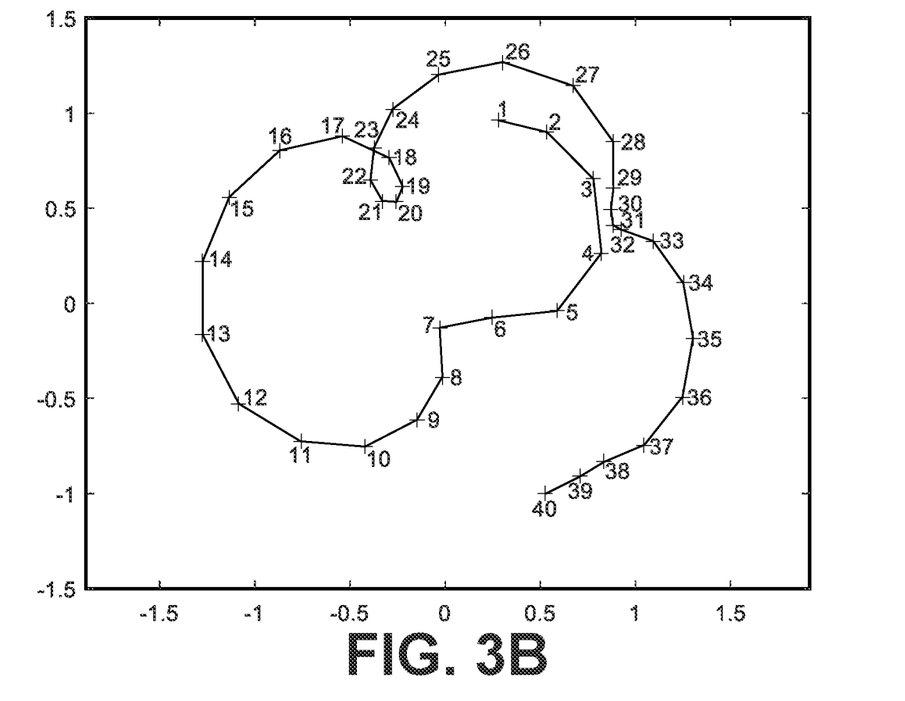
FIG. 3B shows a final estimation of the one-way frequency-domain channel response of FIG. 3A, according to example embodiments.

FIG. 3B shows the final estimation $H_{est}[k]$ determined according to the above. Compared to $H_{sqrt}[k]$ of FIG. 3A, the jump between frequency indices 25 and 26 has been removed, indicating an improved reconstruction of the one-way frequency domain channel response.

For the optional transformation of block 5a, an average phase advance between consecutive frequency indices k may be calculated as:

$$\Delta\phi_{ave}[k] = \frac{\sum_{k=1}^{K_f - 1} \angle(X[k+1]X^*[k])}{2(K_f - 1)}$$

where an asterisk denotes the complex conjugate and ∠ denotes taking the argument of the complex number, i.e., the angle function.

Thus, the average phase advance is calculated by taking the argument of the product of the complex number representing the value proportional to the two-way frequency domain channel response for a frequency and the conjugate of the complex number representing the value proportional to the two-way frequency domain channel response for an adjacent frequency, summing over frequencies, and dividing by two times the number of frequency steps. In the case of non-uniform frequency spacing between successive frequency indices k, the formula may be modified accordingly.

Alternatively, as only the argument/phase of X[k] is used, the magnitude of this value may be omitted from the calculation, only using the argument of X[k].

Then, the transformation of block 5a may be defined as $$H_{prelim}'[k] = H_{prelim}[k]e^{-(k-1)\Delta\phi_{ave}[k]}$$

$$H_{est}'[k] = H_{est}[k]e^{-j(k-1)\Delta\phi_{ave}[k]}$$

This results in a down-mixing, removing an overlaid inherent phase advance between adjacent frequency indices. Thus, each such representation $H_{sqrt}'[k]$ and $H_{est}'[k]$ of a respective quantity $H_{sqrt}[k]$ and $H_{est}[k]$ is a frequency-dependent transformation compensating for an inherent phase advance between adjacent frequencies.

Figure 3C:
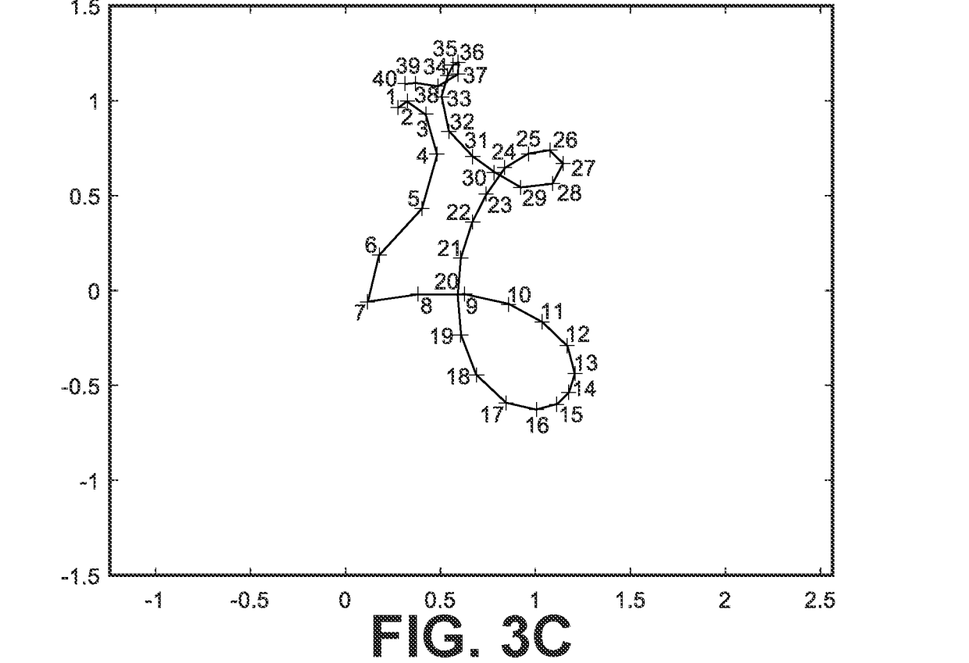
FIG. 3C shows the preliminary estimate of FIG. 3A as transformed to compensate for an inherent phase advance between adjacent frequencies, according to example embodiments.
Figure 3D:
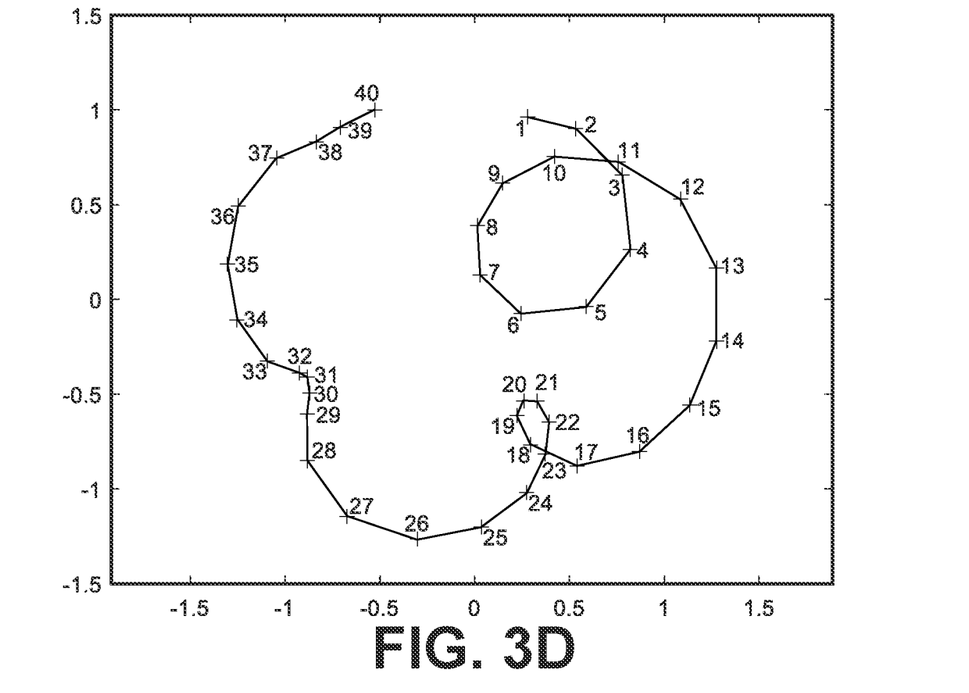
FIG. 3D shows a final estimation derived from the estimate of FIG. 3C, according to example embodiments.

FIG. 3C shows the transformed $H_{prelim}'[k] = H_{sqrt}'[k]$ based on the $H_{prelim}[k] = H_{sqrt}[k]$ of FIG. 3A. As can be seen, the inherent overlaid phase rotation between successive frequency indices is removed. This increases the likelihood of an accurate predicted estimate at block 5b. The predicted estimate at block 5b may either be an adjacent estimate according to the above, or an extrapolation as will be described below.

As mentioned above, the predicted estimate of block 5b, for a frequency index k, may be an extrapolation from two or more estimates for two or more respective adjacent frequencies to the frequency. Extrapolation may be performed using estimates $H_{prelim}'[k]$ as transformed by the transformation described above, or directly on the preliminary estimates $H_{prelim}[k]$, i.e., with $H_{prelim}'[k] = H_{prelim}[k]$.

To simplify notation, define a vector $$h' = [H_{prelim}'[0], H_{prelim}'[1], \ldots, H_{prelim}'[K_f]],$$

and let $h_k'$ denote the kth element of h', and $h_{a:b}'$ a sub-vector of h' starting from the ath element and ending, and including the bth element, in that specific order.

Extrapolation may be performed at an order M, where M signifies the number of adjacent points used for the extrapolation, where M=2, 3, 4 . . . .

An extrapolation function $f(x)$ may be defined, where x signifies an M-dimensional vector of complex values from which the extrapolations should be performed.

For example, $f(x)$ may be a linear extrapolation function, corresponding to order M=2. Such a function may be written $$f([ab]) = b + (b-a) = 2b - a$$

and will be used below.

As another example, $f(x)$ may be a cubic extrapolation function, corresponding to M=3.

The predicted estimate of block 5b (see above) may then be calculated as $$H_{pred}'[k] = H_{pred,L}'[k] = f(h_{k-M:k-1}')$$

and the first metric distance $d_1$ and the second metric distance $d_2$ calculated at block 6 as described above.

Here, the two or more respective adjacent frequencies to the frequency are lower than the frequency corresponding to frequency index k, as signified by the sub-script L.

Additionally, extrapolation may be double-sided, both from below and from above in frequency. Then, a second predicted estimate of the representation of the value proportional to the one-way frequency domain channel response at frequency index k−1 may be calculated as $$H_{pred,H}'[k-1] = f(h_{k+M-1:-1:k}')$$

where ":−1:" indicates a reversal of the elements of the sub-vector. Thus, $H_{pred,H}'[k-1]$ is based on an extrapolation from one or more estimates for frequency index k and one or more respective frequency indices k+1, k+2, . . . , corresponding to frequencies adjacent to and higher than the frequency corresponding to frequency index k, as signified by the sub-script H.

Similar to the first metric distance $d_L$ and the second metric distance $d_L'$, a third metric distance $d_H$ may be calculated, still at block 6, between the second predicted estimate $H_{pred,H}'[k-1]$ and the representation $H_{prelim}'[k-1]$ of the preliminary estimate as $$d_H = \|H_{prelim}'[k-1] - H_{pred,H}'[k-1]\|$$

and a fourth metric distance $d_H'$ may be calculated between the second predicted estimate $H_{pred,H}'[k-1]$ and a phase reversal $-H_{prelim}'[k-1]$ of the representation of the preliminary estimate as $$d_H' = \|-H_{prelim}'[k-1] - H_{pred,H}'[k-1]\| = \|H_{prelim}'[k-1] + H_{pred,H}'[k-1]\|,$$

where the condition $d_H' < d_H$ indicates an incorrect sign in the preliminary estimate $H_{prelim}[k]$, as it indicates a sign flip between $H_{prelim}[k-1]$ and $H_{prelim}[k]$.

The information from comparing, respectively, $d_L$ and $d_L'$, and $d_H$ and $d_H'$ may be combined. Thus, for example, at block 8, the final estimation may be $$H_{est}[k] = -H_{prelim}[k]$$

if and only if $d_L' < d_L$ and $d_H' < d_H$, and $$H_{est}[k] = H_{prelim}[k]$$

otherwise.

Thus, in this case of double-sided extrapolation, the final estimate $H_{est}[k]$ of the value proportional to the one-way frequency domain channel response is based on comparison of the first metric distance $d_L$, the second metric distance $d_L'$, the third metric distance $d_H$, and the fourth metric distance $d_H'$.

Figure 4:
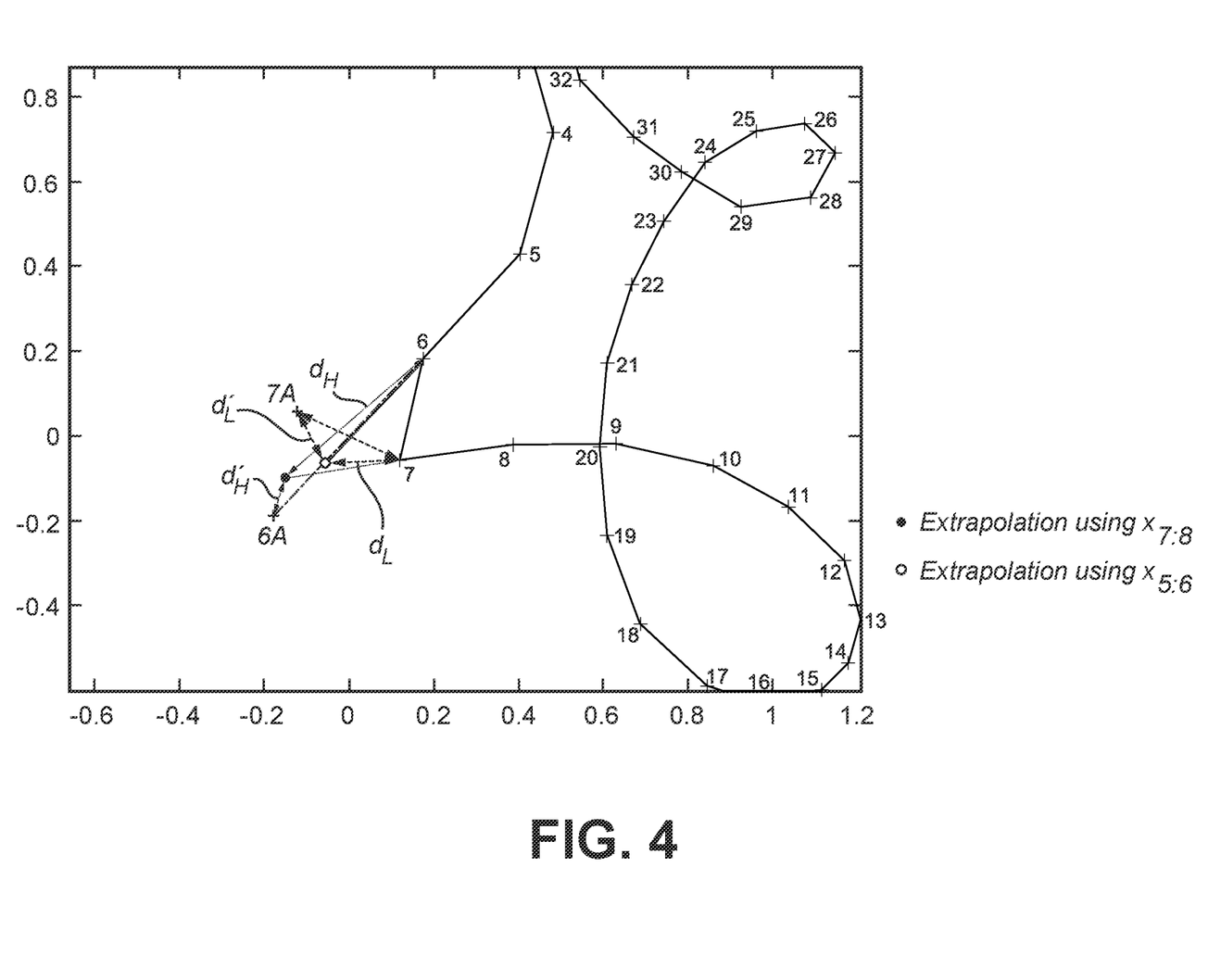
FIG. 4 illustrates extrapolation, according to example embodiments.

The functioning of the extrapolation from both below and above in frequency may be better understood with reference to FIGS. 3B, 3C, and 4, illustrating a limitation of reconstruction without extrapolation.

With reference to FIG. 3B, even though the jump at frequency index 26 is corrected successfully, frequency index 7 was mistakenly phase reversed, as is evident from the apparent discontinuity of the otherwise smooth progression of the direction of the tangent of the resulting curve, due to that points small magnitude compared to its distance to the point corresponding to the previous frequency index 6. Such a phenomenon may for example occur when experiencing deep fading at certain frequencies, due to multipath propagation. FIG. 3C shows that this discontinuity is present as well, in this example, after the transformation to compensate for the inherent phase advance.

FIG. 4 is a close-up look of the area around the point corresponding to frequency index 7 in FIG. 3C and illustrates linear extrapolation according to the above for frequency index k=7.

Shown with plus symbols and frequency indices are the transformed representations $H_{prelim}'[k]$ of the preliminary estimates $H_{prelim}[k]$.

A phase reversal $-H_{prelim}'[7]$ (corresponding to reflection in the origin) of the representation of the preliminary estimate $H_{prelim}'[7]$ for frequency index 7 is marked 7A. In the same way, a phase reversal $-H_{prelim}'[6]$ of the representation of the representation of the preliminary estimate $H_{prelim}'[6]$ for frequency index 6 is marked 6A.

Further, shown with an unfilled (white) circle is a prediction $H_{pred,L}[7]$ based on a linear extrapolation from lower frequencies, viz., from preliminary estimates $H_{prelim}'[5]$ and $H_{prelim}'[6]$.

Metric distances in the complex plane $d_L$—between $H_{prelim}[7]$ ("7") and $H_{pred,L}[7]$ (unfilled circle)—and $d_L'$ between $-H_{prelim}'[7]$ ("7A") and $H_{pred,L}[7]$ (unfilled circle) are further shown.

Since, in this example, $d_L' < d_L$, the phase-inversed preliminary estimate $-H_{prelim}[7]$ becomes the final estimate, i.e., $H_{est}[7] = -H_{prelim}[7]$.

Further, extrapolation from higher frequency is shown. The prediction $H_{pred,H}'[6]$ from a linear extrapolation from preliminary estimates $H_{prelim}'[8]$ and $H_{prelim}'[7]$ is shown with a filled (black circle).

Metric distances in the complex plane $d_H$—between $H_{prelim}'[6]$ ("6") and $H_{pred,H}'[6]$ (filled circle)—and $d_H'$ between $-H_{prelim}[6]$ ("6B") and $H_{pred,H}'[6]$ (filled circle) are further shown.

Thus, in this example, $d_H' < d_H$. This further indicated that a phase reversal has occurred for the preliminary estimate between frequency indices 6 and 7, indicating the need to for a phase reversal in the final estimate for frequency index 7 in compensation.

Thus, with both $d_L' < d_L$ and $d_H' < d_H$, also when performing double-sided extrapolation, $H_{est}[7] = -H_{prelim}[7]$.

Finally, in block 10 of FIG. 2, the distance between the first and the second radio signal transceiver may be determined based on the final estimates. For example, an inverse fast Fourier transform (IFFT) can be used but also more advanced signal processing techniques typically referred to as super-resolution algorithms, as described in, e.g., Schmidt: IEEE Transactions on Antennas and Propagation, Vol AP-34, No. 3, pp. 276-280, March 1986;

Sakar: IEEE Antennas and Propagation Magazine, Vol. 37, No. 1, pp. 48-55, February 1995; and Roy: IEEE Transactions on Acoustics, Speech, and Signal Processing, Vol. 37, No. 7, July 1989.

The reconstructed one-way frequency-domain channel response H[k] allows most ranging algorithms to mitigate more interference from multipath, as the order of the problem/number of components is reduced. In the presence of multipath, the number of components interfering with the estimation of the delay of the line-of-sight (LOS) component will be reduced and ranging and localization will be more accurate.

A computer program product comprising a computer-readable medium may store computer-readable instructions such that when executed on a processing unit the computer program product will cause the processing unit to perform the method according to the above.

The method may be performed in a processing unit, which may be arranged in a device A, B or C as discussed above.

The processing unit may be implemented in hardware, or as any combination of software and hardware. At least part of the functionality of the processing unit may, for instance, be implemented as software being executed on a general-purpose computer. The system may thus comprise one or more processing units, such as a central processing unit (CPU), which may execute the instructions of one or more computer programs in order to implement various desired functionality.

The processing unit may alternatively be implemented as firmware arranged e.g. in an embedded system, or as a specifically designed processing unit, such as an Application-Specific Integrated Circuit (ASIC) or a Field-Programmable Gate Array (FPGA).

The correlation properties for the one-way frequency domain channel response for adjacent frequencies will naturally vary depending on the exact environment. There may be a range of frequency step sizes where the method disclosed herein works increasingly well as the frequency stepping is reduced, but where no hard upper limit of applicability can be defined.

The concept of coherence bandwidth is a statistical measurement that is approximately the maximum frequency interval over which two signals at two frequencies experience correlated amplitude fading. An approximation of the coherence bandwidth over which the amplitude correlation is lower than 0.5 is $$B_c = \frac{1}{5\sigma_{T_m}}$$

where $\sigma_{T_m}$ is the root mean square (RMS) delay spread (Goldsmith, Andrea. Wireless communications. Cambridge university press, 2005.)

According to a measurement campaign at 2.4 GHz in a 7.8 m-by-10 m room where benches and laboratory equipment scatter around, the RMS delay spread ranges from 20 ns to 30 ns depending on the relative distance between Tx and Rx (Zepernick, H. J., & Wysocki, T. A. Multipath channel parameters for the indoor radio at 2.4 GHz ISM band. In 1999 IEEE 49th Vehicular Technology Conference, May 1999, Vol. 1, pp. 190-193). This indicates a coherence bandwidth in such an environment be around 8 MHz (with $\sigma_{T_m}=25$ ns).

A typical ranging and direction-finding system may operate in the ISM band with a frequency step in the order of 1 MHz. According to the above, this this frequency step is small enough that the one-way frequency domain channel responses are correlated.

Additionally, the phase of frequency responses that are at different frequencies are correlated as well, because the slope of the phase along frequency is proportional to the distance between the initiator and reflector in a line-of-sight (LOS) channel. The amplitude coherency and phase coherency across frequency samples of the wireless channel when observed at every 1 MHz ensures that the complex frequency response rotates progressively rather than arbitrarily.

In the following, results validating the channel reconstruction of the one-way frequency domain channel response according to the present disclosure, including the transformation and double-sided linear extrapolation as detailed above.

Figure 5:
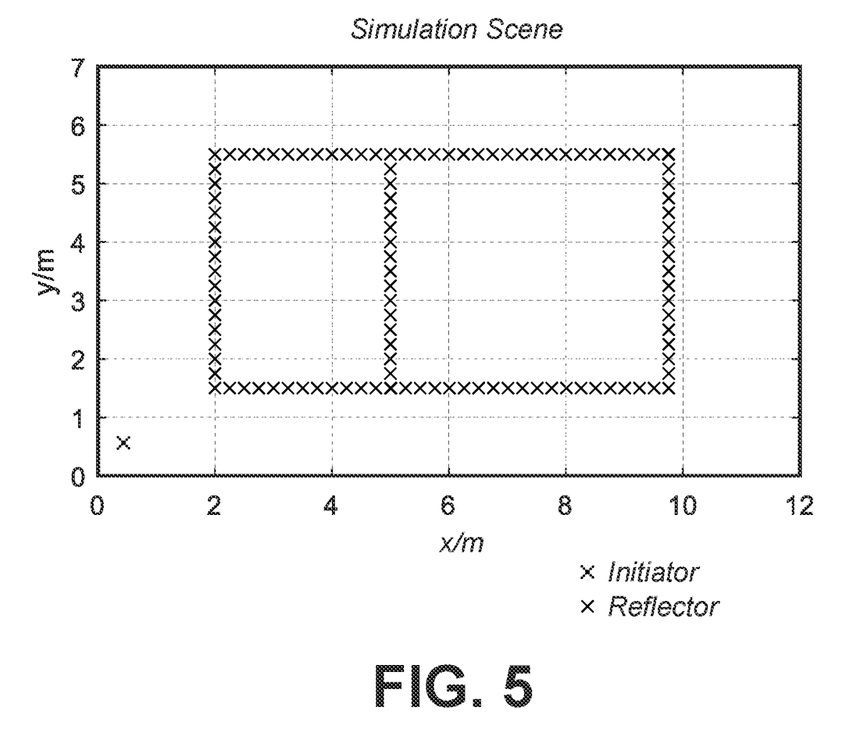
FIG. 5 shows a simulation geometry, according to example embodiments.
Figure 6A:
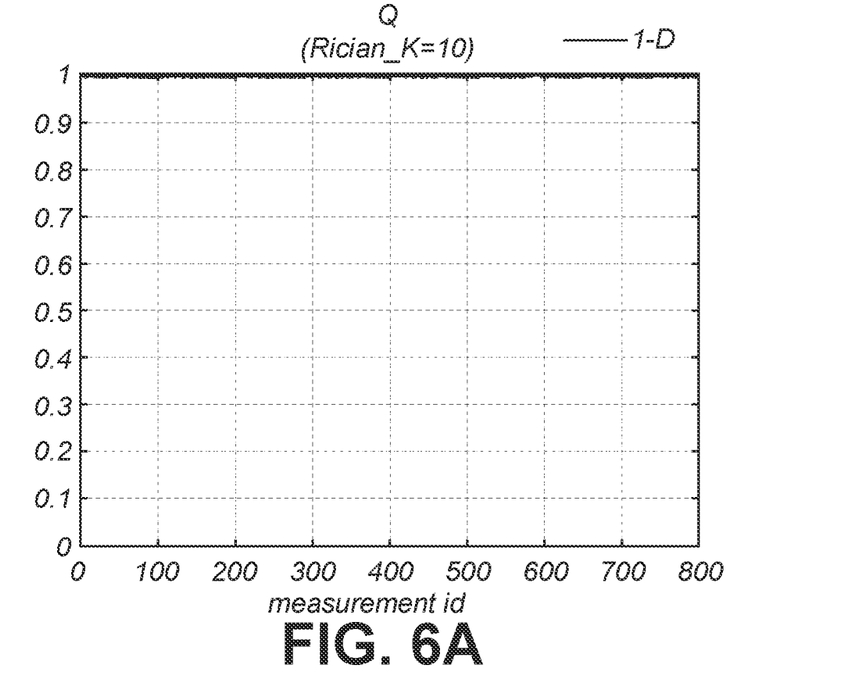
FIG. 6A shows a simulated reconstruction performance in the form of a channel quality indicator.
Figure 6B:
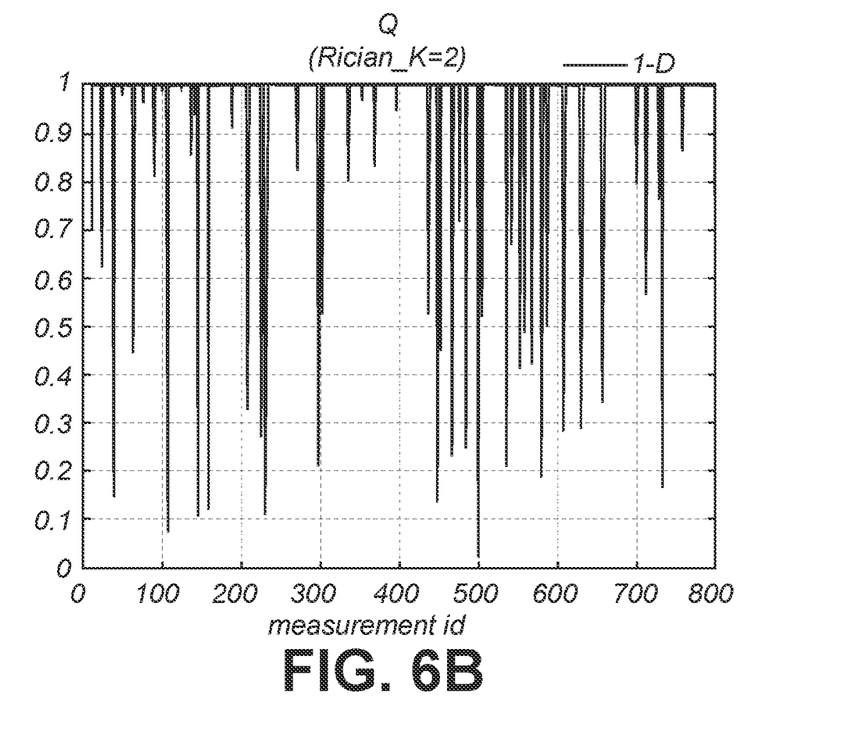
FIG. 6B shows a simulated reconstruction performance in the form of a channel quality indicator, according to example embodiments.
Figure 6C:
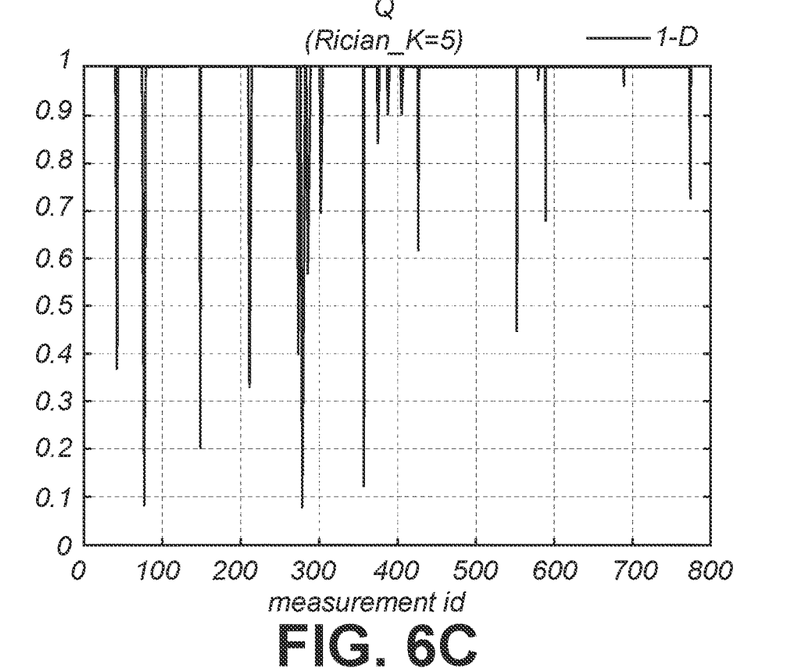
FIG. 6C shows a simulated reconstruction performance in the form of a channel quality indicator, according to example embodiments.
Figure 6D:
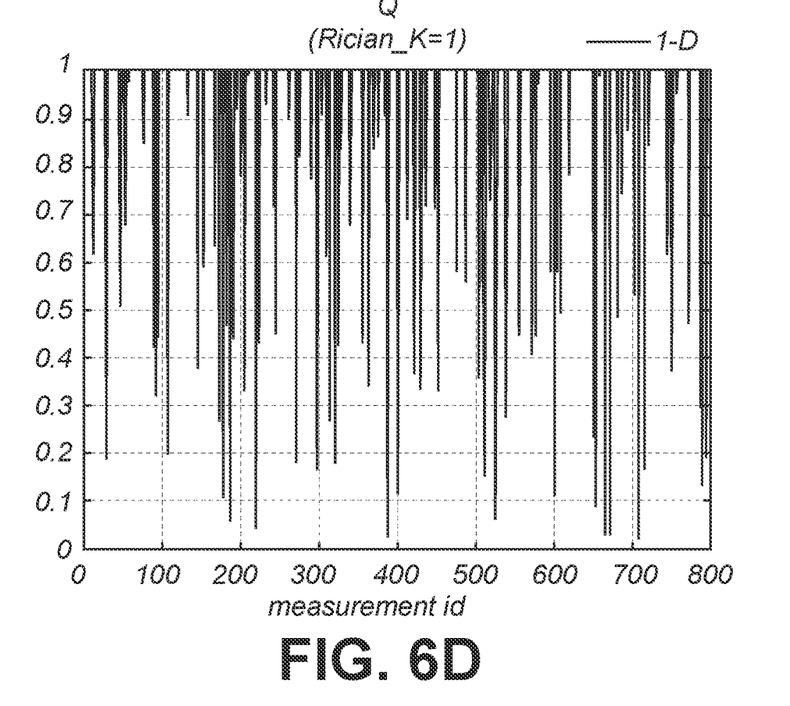
FIG. 6D shows a simulated reconstruction performance in the form of a channel quality indicator, according to example embodiments.

Multi-path channels were generated using ray tracing. In the ray tracer, a 11 m-by-7 m meeting room without furniture was defined, as illustrated in FIG. 5. An initiator was put in one of the corners while the reflector was moved around the room at 112 distinct locations forming the shape of an Arabic numeral 8. The scene is shown in FIG. 5. The simulation contained up to 3rd order reflections. Random phase offsets were selected uniformly randomly from 0 to $2\pi$ radians and added to the channel response each time the carrier frequency was switched. The phase offset was kept constant when switching the direction of transmission. White Gaussian noise was added such that the SNR per antenna was 20 dB.

An indicator of reconstruction reliability was defined in the form of a reconstructed-channel quality indicator Q, describing the similarity between the reconstructed channel and the actual channel. It is defined by:

$$Q = \left| \frac{h_{est}^H h}{\sqrt{h^H h} \sqrt{h_{est}^H h_{est}}} \right|$$

where $h_{est}$ and h are column vectors, which are the estimated channel and the actual channel vectors, respectively, and H denotes the operation of conjugate transpose. The closer Q is to 1, the better the reconstruction matches the actual channel.

FIGS. 6A-6D respectively show the quality indicator Q for Rician-K values 10, 2, 5, and 1. The higher the Rician-K value, the stronger the line-of-sight component is with respect to multipath propagation. Each of the figures shows the Q value for a number of simulated radio channels as described above.

One can see that for high K values, the channel reconstruction is flawless. If the Rician K value reduces, performance of the algorithm somewhat reduces, while still a good reconstruction is realized for a significant part of the channels.

In the above, embodiments have mainly been described with reference to a limited number of examples. However, as is readily appreciated, other examples than the ones disclosed above are equally possible within the scope of the disclosure.

For example, the extrapolation can be done linearly, as described throughout, or in more sophisticated manners, e.g. using higher-order, non-linear extrapolation.

Instead of calculating an average phase advance transformation compensating for the inherent phase advance between adjacent frequencies may be provided through a tracking algorithm.

The invention claimed is:

1. A method for determining a distance between a first radio signal transceiver and a second radio signal transceiver, wherein the method comprises:
receiving a first set of measurement results and a second set of measurement results, wherein the first set of measurement results is acquired by the first radio signal transceiver based on signals transmitted from the second radio signal transceiver and the second set of measurement results is acquired by the second radio signal transceiver based on signals transmitted from the first radio signal transceiver, wherein the first set of measurement results is representable as comprising, for each of a plurality of frequencies, a measurement pair of a phase value and a signal strength value and the second set of measurement results is representable as comprising, for each of the plurality of frequencies, a phase value or a measurement pair of a phase value and a signal strength value;
calculating, for each frequency of the plurality of frequencies, a preliminary estimate of a value proportional to a one-way frequency domain channel response, wherein the plurality of frequencies do not exhibit phase coherency or timing coherency with one another, and wherein the preliminary estimate is based on:
the measurement results for the frequency from the first set of measurement results and the phase value; or
the measurement results for the frequency from the second set of measurement results;
calculating, for a frequency of the plurality of frequencies, a predicted estimate of a representation of the value proportional to the one-way frequency domain channel response, wherein the predicted estimate is based on one or more estimates for one or more respective frequencies adjacent to the frequency;
calculating a first metric distance between the predicted estimate for the frequency and a representation of the preliminary estimate for the frequency;
calculating a second metric distance between the predicted estimate for the frequency and a phase reversal of the representation of the preliminary estimate for the frequency;
determining, for the frequency, a final estimate of the value proportional to the one-way frequency domain channel response, wherein the final estimate is based on a comparison of the first metric distance and the second metric distance, and wherein the final estimate is either a phase reversal of the preliminary estimate or the preliminary estimate; and
determining the distance between the first radio signal transceiver and the second radio signal transceiver based on a plurality of such final estimates.

2. The method of claim 1, wherein the predicted estimate is a representation of an estimate for an immediately adjacent frequency.

3. The method of claim 1, wherein the predicted estimate is an extrapolation from two or more estimates for two or more respective adjacent frequencies to the frequency.

4. The method of claim 3, wherein the two or more respective adjacent frequencies to the frequency are lower than the frequency, and wherein the method further comprises:
calculating a second predicted estimate of a representation of a value proportional to a one-way frequency domain channel response, wherein the second predicted estimate is based on one or more estimates for the frequency and one or more respective frequencies adjacent to and higher than the frequency;
calculating a third metric distance between the second predicted estimate and a representation of a preliminary estimate corresponding to the second predicted estimate; and
calculating a fourth metric distance between the second predicted estimate and a phase reversal of the representation of the preliminary estimate corresponding to the second predicted estimate,
wherein the final estimate of the value proportional to the one-way frequency domain channel response is based on comparison of the first metric distance, the second metric distance, the third metric distance, or the fourth metric distance.

5. The method of claim 1, wherein each representation of a respective quantity is the quantity itself.

6. The method of claim 1, wherein each representation of a respective quantity is a frequency-dependent transformation compensating for an inherent phase advance between adjacent frequencies.

7. The method of claim 6, wherein the frequency-dependent transformation is calculated as an average phase advance between the plurality of frequencies.

8. The method according to claim 1, wherein calculating the preliminary estimate of the value proportional to the one-way frequency domain channel response comprises:
calculating an estimate of a value proportional to a two-way frequency domain channel response based on the measurements for the frequency from the first set of measurement results and the phase value or the measurements for the frequency from the second set of measurement results; and
calculating the preliminary estimate proportional to the one-way frequency domain channel response based on the estimate of the value proportional to the two-way frequency domain channel response.

9. The method according to claim 1,
wherein each measurement pair of the measurement pairs is representable as a first complex number,
wherein a modulus of the first complex number represents an amplitude corresponding to the signal strength value and an argument of the first complex number represents the phase value,
wherein the preliminary estimate and the final estimate each are representable by second complex numbers, and
wherein a modulus of the second complex number represents an amplitude response and the argument of the second complex number represents a phase response.

10. The method according to claim 9,
wherein the second set of measurement results comprises, for each of the plurality of frequencies, the measurement pair, and
wherein calculating the estimate of the value proportional to a two-way frequency domain channel response comprises, or is representable as comprising, multiplying the first complex number representing the measurement pair from the first set of measurement results with the first complex number representing the measurement pair from the second set of measurement results.

11. The method according to claim 10, wherein calculating the preliminary estimate of the value proportional to the one-way frequency domain channel response based on the estimate of the value proportional to the two-way frequency domain channel response comprises, or is representable as comprising, taking a complex square root of the estimate proportional to the two-way frequency domain channel response.

12. The method according to claim 11, wherein, when taking the complex square root, a solution with a phase between $-\pi/2$ and $\pi/2$ is selected.

13. The method according to claim 1, wherein determining the distance between the first radio signal transceiver and the second radio signal transceiver uses an algorithm based on IFFT or a super-resolution algorithm.

14. A non-transitory, computer-readable medium storing computer readable instructions that, when executed on a processor, will cause the processor to perform the method according to claim 1.

15. A radio signal transceiver configured to determine a distance to a second radio signal transceiver, wherein the radio signal transceiver is configured to:
acquire a first set of measurement results based on signals transmitted from the second radio signal transceiver, wherein the first set of measurement results is representable as comprising, for each of a plurality of frequencies, a measurement pair of a phase value and a signal strength value;
receive a second set of measurement results acquired by the second radio signal transceiver based on signals transmitted from the radio signal transceiver, wherein the second set of measurement results is representable as comprising, for each of a plurality of frequencies, a phase value or a measurement pair of a phase value and a signal strength value;
calculate for each frequency of the plurality of frequencies, a preliminary estimate of a value proportional to a one-way frequency domain channel response, wherein the plurality of frequencies do not exhibit phase coherency or timing coherency with one another, and wherein the preliminary estimate is based on:
the measurement results for the frequency from the first set of measurement results and the phase value; or
the measurement results for the frequency from the second set of measurement results;
calculate, for a frequency of the plurality of frequencies, a predicted estimate of a representation of the value proportional to the one-way frequency domain channel response, wherein the predicted estimate is based on one or more estimates for one or more respective frequencies adjacent to the frequency;
calculate a first metric distance between the predicted estimate for the frequency and a representation of the preliminary estimate for the frequency;
calculate a second metric distance between the predicted estimate for the frequency and a phase reversal of the representation of the preliminary estimate for the frequency;
determine, for the frequency, a final estimate of the value proportional to the one-way frequency domain channel response, wherein the final estimate is based on a comparison of the first metric distance and the second metric distance, and wherein the final estimate is either a phase reversal of the preliminary estimate or the preliminary estimate; and determine the distance between the first radio signal transceiver and the second radio signal transceiver based on a plurality of such final estimates.

16. The radio signal transceiver of claim 15, wherein the predicted estimate is a representation of an estimate for an immediately adjacent frequency.

17. The radio signal transceiver of claim 15, wherein the predicted estimate is an extrapolation from two or more estimates for two or more respective adjacent frequencies to the frequency.

18. The radio signal transceiver of claim 15, wherein each representation of a respective quantity is the quantity itself.

19. The radio signal transceiver of claim 15, wherein each representation of a respective quantity is a frequency-dependent transformation compensating for an inherent phase advance between adjacent frequencies.

20. The radio signal transceiver of claim 19, wherein the frequency-dependent transformation is calculated as an average phase advance between the plurality of frequencies.

\* \* \* \* \*